F. W. DUKE.
MOUNTING OF RIMLESS EYEGLASSES.
APPLICATION FILED JUNE 22, 1914. RENEWED MAY 11, 1917.
1,249,353. Patented Dec. 11, 1917.
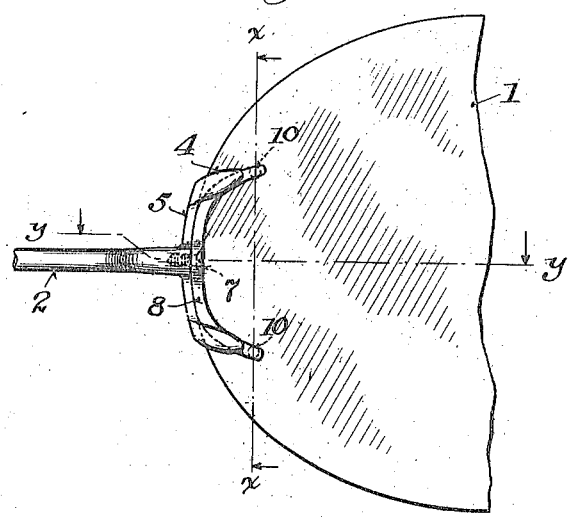
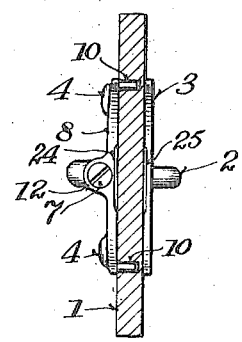
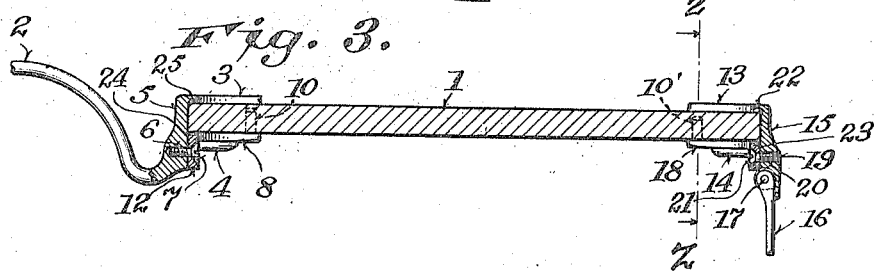
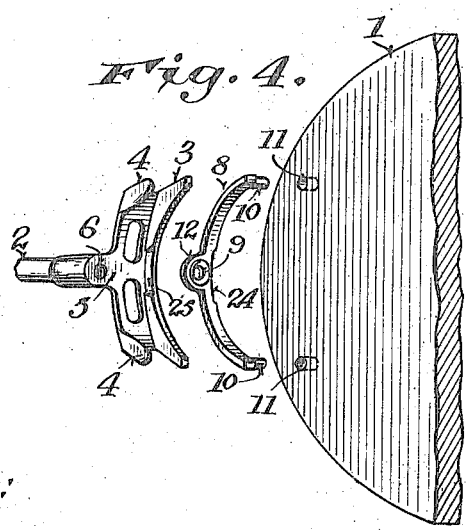
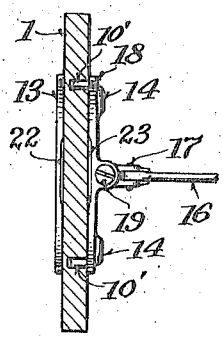
Witnesses:
Alice J. McKiernan.
Irma D. Bremer.
Inventor:
Fred W. Duke
By Erwin & Winter
Attorneys.

UNITED STATES PATENT OFFICE.

FRED W. DUKE, OF MILWAUKEE, WISCONSIN.

MOUNTING OF RIMLESS EYEGLASSES.

1,249,353.  Specification of Letters Patent.  Patented Dec. 11, 1917.

Application filed June 22, 1914, Serial No. 846,503. Renewed May 11, 1917. Serial No. 168,061.

*To all whom it may concern:*

Be it known that I, FRED W. DUKE, a citizen of the United States, residing at the city of Milwaukee, county of Milwaukee, and State of Wisconsin, have invented new and useful Improvements in Mountings of Rimless Eyeglasses, of which the following is a specification.

My invention relates to improvements in mountings of rimless glasses and it pertains more especially, among other things; first, to the device for attaching the bridge or nose-piece to the glasses; and second, to the device for attaching the bows to the opposite sides of the lens, whereby the vision of the wearer of the glasses is not only less obstructed, but the glasses are more securely retained in their mountings, and are less liable to become loose and wabbly therein.

My invention is further explained by reference to the accompanying drawings in which, Figure 1 represents a rear view of a portion of one of the lenses with the bridge mountings connected therewith.

Fig. 2 is a vertical section drawn on line $x$, $x$ of Fig. 1, looking in the direction of the arrows.

Fig. 3 is a transverse section drawn on line $y$, $y$ of Fig. 1, but showing in addition thereto a complete lens with a section of the mechanism for connecting one of the bows thereto.

Fig. 4 is a perspective view of one side of one of a portion of the lenses, showing several clamping members for connecting the bridge member or nose piece thereto, and Fig. 5 is a vertical section of a portion of one of the lenses taken on line $z$, $z$, of Fig. 3.

Like parts are identified by the same reference numerals throughout the several views.

1 represents one of the lenses of the eye glasses. 2 is a bridge or nose piece. The nose piece 2 is formed integrally with the two clamping members 3 and 4, which are adapted to nicely fit one end of the lens 1. The members 3 and 4 are connected together by shanks or central member 5, and the central member 5 is provided with a threaded aperture 6 for the reception of the screw 7. 8 is a wedge member which is provided with a smooth aperture 9 for the reception of said screw 7. The wedge member 8 is provided at its respective ends with transversely arranged pins 10 which are formed integrally therewith, and the lens 1 is provided with apertures 11, 11 for the reception of said pins 10. When assembling my device the angular projections 10 are first inserted in the apertures 11 of the lenses, the lenses are then placed between the clamping members 3 and 4 respectively, when said wedge members are retained in place by the screws 7, said screws being turned down firmly in the threaded apertures 6 against the collar 12 surrounding the aperture 9, whereby the wedge member 8 is securely retained in place and prevented from wabbling or being withdrawn from between the clamping members. When the two opposing lenses are connected with the bridge 2 by the mechanism described, the clamping members 13 and 14 are in like manner secured to the opposite end of the lens 1, as shown in Fig. 3. The clamping members 13 and 14 are formed integral with the shank 15. The shank 15 extends rearwardly at right angles to the lens, as shown in said Fig. 3, when the bows 16 are connected therewith by the pivotal screw or pin 17. When the clamping members 13 and 14 are in place, a second wedge member 18 is inserted between the clamping members 14 and the lenses and said wedges are retained in place by the screws 19, which screws have threaded bearings in apertures 20 provided therefor in said shank members 15. While but one of the lenses are shown it will be understood that two such lenses are used and the outer end of each lens is provided with similar mechanism to that shown on the right hand side of Fig. 3.

It will, of course, be understood that the wedge member 18 is provided with an aperture 21 for the reception of said screw 19. It will be obvious that by thus connecting the lens 1 with both the bridge 2 and bows 16 through two integrally formed mountings, and that by inserting the respective wedge members 8 and 18 between such lens and the opposing mountings, as shown in Fig. 3, said lens is not liable to become loose in the mountings for the reason, among other things, that said wedge members 8 and 18 are each provided with two transversely arranged pins 10 and 10', and each of said wedge members are retained in place by screws 7 and 19, respectively, whereby such wedges are securely retained in place, while owing to the fact that said wedge members are connected with the lenses 1 through said transversely arranged pins located at a considerable distance apart, said lenses are not liable to become loose in their mountings. The wedge members 8 and 18 and the opposing clamping members are preferably provided with shallow recesses 22, 23, 24 and 25, whereby such parts are adapted to yield slightly under the pressure of the respective screws 7 and 19, as such screws are turned down in their bearings, whereby the liability of fracturing the lens is avoided, and said parts are caused to more securely impinge the lens and retain the same more securely in their mountings.

Having thus described my invention what I claim as new and desire to secure by Letters Patent, is—

1. In a device of the described class, the combination of a lens provided with a plurality of apertures, a lens mounting comprising a pair of clamping members connected together by a shank, a wedge member provided at its respective ends with angular projections adapted to enter the apertures in said lens, and means for retaining said wedge member in place between one of said clamping members and such lens.

2. In a device of the described class, a pair of lenses provided with a plurality of apertures, a pair of lens mountings each comprising a pair of clamping members, said clamping members being adapted to engage the respective opposite sides of said lens, wedge members provided at their ends with angular projections adapted to enter the apertures in said lenses, and means for retaining said wedge members between the opposing surfaces of said lenses and clamping members.

3. In a device of the described class, a pair of lenses each lens provided with a plurality of apertures, a pair of lens mountings, a bridge member formed integral with said mountings, each comprising a set of clamping members adapted to engage the respective sides of said lenses, wedge members provided at their ends with angular projections adapted to engage the apertures in said lenses, and means for retaining said wedge members between opposing surfaces of said lenses and clamping members.

In testimony whereof I affix my signature in the presence of two witnesses.

FRED W. DUKE.

Witnesses:
JAS. B. ERWIN,
IRMA D. BREMER.

Copies of this patent may be obtained for five cents each, by addressing the "Commissioner of Patents, Washington, D. C."